J. HALICKI.
TREE TRIMMER.
APPLICATION FILED APR. 29, 1920.
1,375,091.
Patented Apr. 19, 1921.
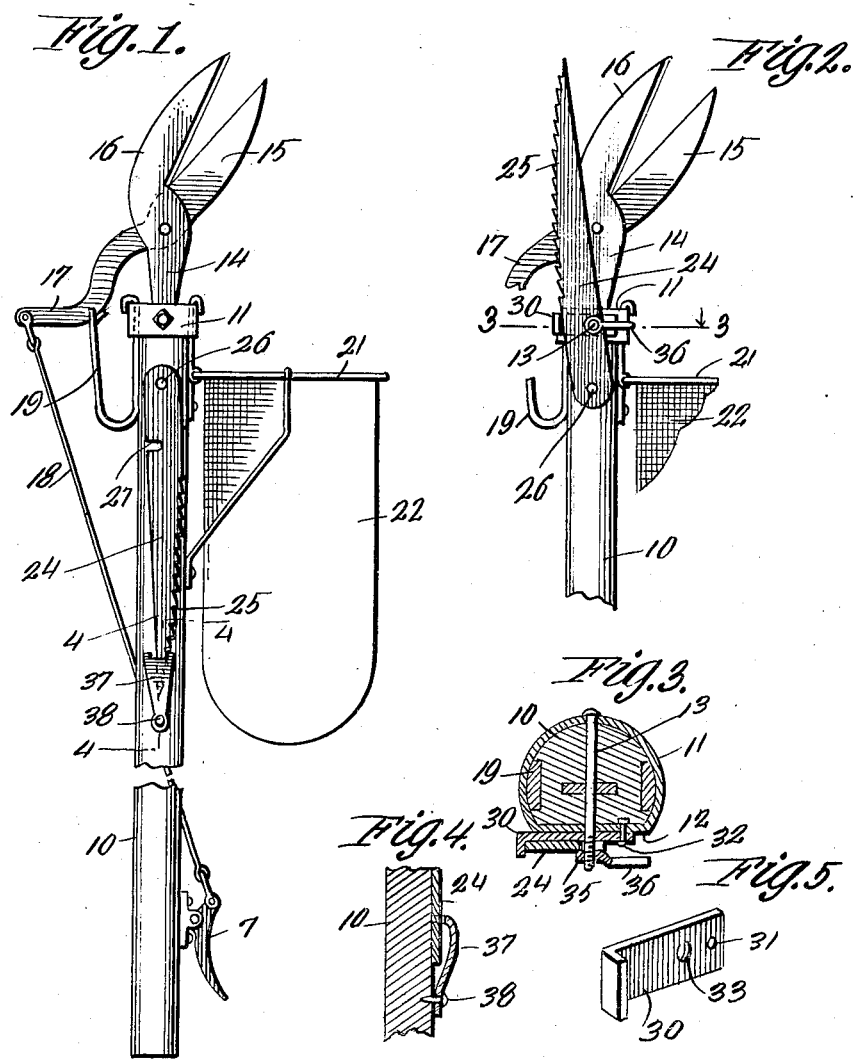
WITNESSES
JOHN HALICKI INVENTOR.
BY
ATTORNEY.

UNITED STATES PATENT OFFICE.

JOHN HALICKI, OF DUNKIRK, NEW YORK.

TREE-TRIMMER.

1,375,091.   Specification of Letters Patent.   Patented Apr. 19, 1921.

Application filed April 29, 1920.  Serial No. 377,526.

*To all whom it may concern:*

Be it known that I, JOHN HALICKI, a citizen of the United States, residing at Dunkirk, in the county of Chautauqua and State of New York, have invented certain new and useful Improvements in Tree-Trimmers, of which the following is a specification.

This invention relates to a tree trimmer to be used especially upon a fruit gatherer such as is described in my pending application Serial Number 346,917, filed December 23, 1919, and has for its principal object the provision of a trimming mechanism particularly for fruit trees wherein the trimming may be performed while the operator is standing on the ground and the trimming saw may be placed in a convenient position so as to be out of the way of the other parts of the device when the trimming saw is not in use.

Another object of the invention is to provide simple and efficient means for holding the saw in an operative position and also means for holding the saw in its inoperative position.

With these and other objects in view my invention comprehends the tree trimmer that embodies the peculiar construction and novel combination of parts all of which will be hereinafter fully explained and specifically pointed out in the appended claim and illustrated in the accompanying drawings.

In the drawings:—

Figure 1 is a side elevation of my invention,

Fig. 2 is a fragmentary side elevation of the upper portion of my invention showing the trimming saw in an operative position.

Figs. 3 and 4 are sections taken on the lines 3—3 and 4—4 of Figs. 2 and 1 respectively, and Fig. 5 is a detailed perspective view of the hook used to hold the saw in an operative position.

In the preferred embodiment of my invention it will be seen that the numeral 10 designates the staff having the collar 11 upon its upper end. This collar 11 is provided with the flattened portion 12 shown plainly in Fig. 3. A bolt 13 holds the collar upon the staff 1 and also passes through the shank of the trimming device indicated generally at 14. This trimming device may be of any preferred construction but as shown consists of the movable jaw 15 and the fixed jaw 16. Extending from the movable jaw 15 is the arm 17 loosely connected to a rod 18 having its other end connected to the manipulating lever 7 carried by the staff 10. A spring 19 is carried by the collar 11 so as to normally hold the movable jaw 15 in an open position thus far pressing upon the manipulating lever the jaws will be closed and the spring 19 will open these jaws when the pressure is released from the manipulating lever 7. A frame 21 carries the bag 22 for catching the fruit which will be plucked from the tree by the trimming or gathering device 14. This basket 21 is disposed below the jaws 15 and 16 as is clearly shown in Fig. 1 of the drawing.

I have also provided the trimming saw 24 having the usual sawing teeth 25 upon one edge. This saw 24 is pivotally carried adjacent the upper end of the staff 10 by means of the rivet 26 and is provided with the slot 27 which is adapted to receive the end of the bolt 13 as is clearly shown in Figs. 2 and 3 of the drawing when the saw is in an operative position that is is extending upwardly from the staff 10. In order to hold this saw 24 in the extended or operative position the bolt 13 engages the slot 27 of the saw while the hook 30 which is provided with an aperture 31 for receiving the rivet 32 and an aperture 33 for receiving the bolt 13 engages the non-toothed portion of the cutting edge of the saw as is clearly shown in both Figs. 2 and 3 of the drawing. A nut 35 is threadedly mounted upon the bolt 13 and is provided with the lever 36 so that it may be tightened so as to hold the saw 24 and the hook 30 in snug relation to each other.

When it is desired to hold the saw in an inoperative position it will be seen that the hook 30 will be removed or the nut 35 may be loosened and the saw bent so as to pass over the end portion of the hook and take the position shown in Fig. 1 of the drawing that is extending along the body portion of the staff 10. In order to hold the saw from swinging and interfering with the work thereof I have provided the spring clip 37 which is coiled upon the staff by means of the rivet 38. This clip 37 is bifurcated at its ends so as to allow the point of the saw 24 to extend therebetween. It will also be noted that this clip 37 extends outwardly from the staff and then inwardly so that the ends of the bifurcated portions will engage the staff. When it is desired to either insert the end of the saw through the bifurcated portion or to remove the saw therefrom it will be seen that the clip may be easily bent outwardly and because of its spring material it will immediately engage the staff when released.

Having thus fully described my invention what I claim as new is:—

In a device of the class described, the combination of a staff having a collar at its upper end, of a saw pivotally mounted a spaced distance from the upper end of said staff, said saw provided with a slot adjacent its pivoted end, a bolt passing through the upper end of said staff and through said collar, said bolt extending beyond said collar so as to engage the slot of said saw when same is in an operative position, a hook pivotally mounted on said bolt and adapted to engage one edge of said saw so as to hold said slot in engagement with the bolt, and means provided for holding said saw in an inoperative position.

In testimony whereof I affix my signature in presence of two witnesses.

JOHN HALICKI.

Witnesses:
 FRANK NIEDZWIECKI,
 B. BEKELESKI.